(No Model.)
T. A. EDISON.
RAILWAY SIGNALING.
No. 470,923. Patented Mar. 15, 1892.
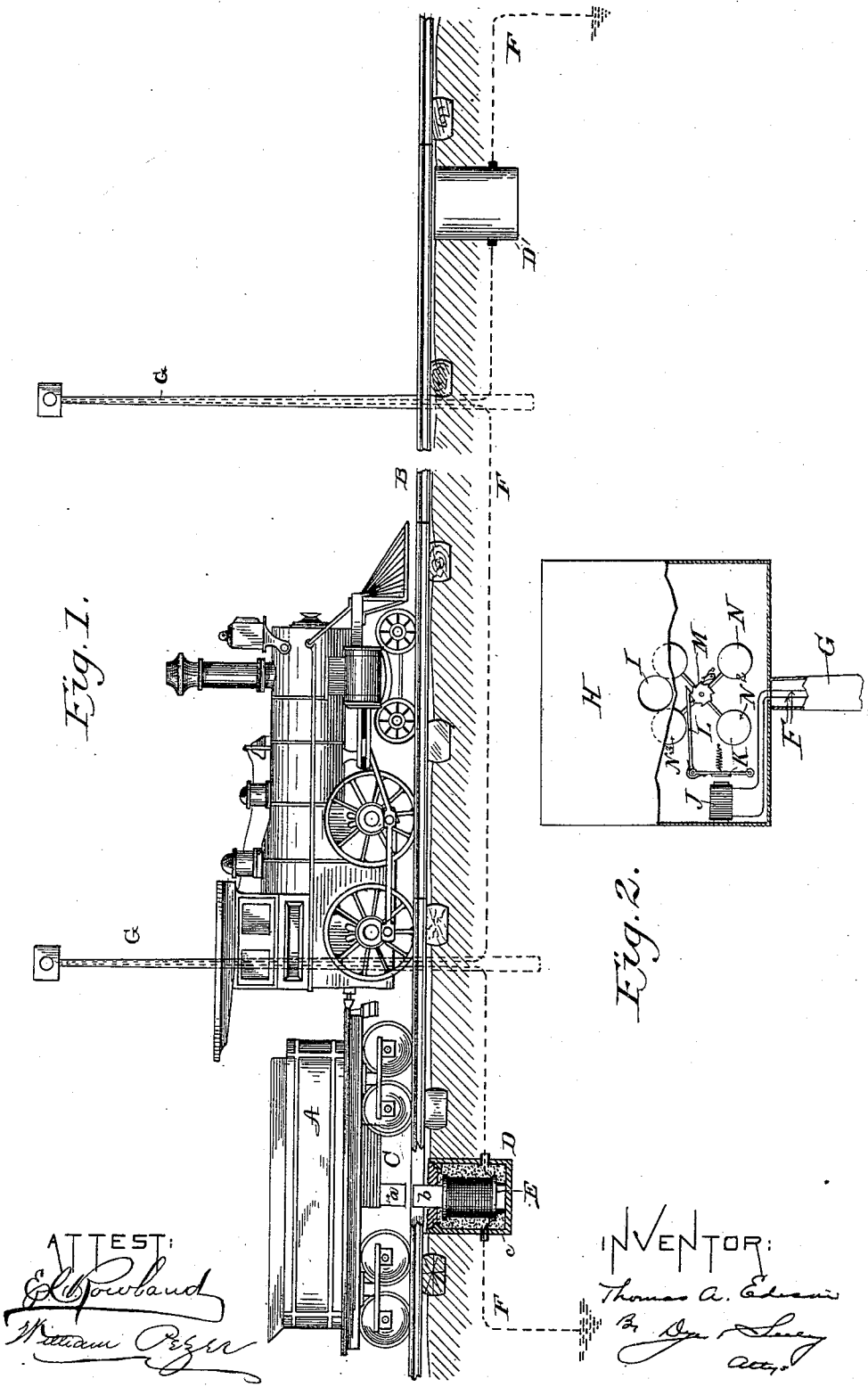

UNITED STATES PATENT OFFICE.

THOMAS A. EDISON, OF LLEWELLYN PARK, NEW JERSEY.

RAILWAY-SIGNALING.

SPECIFICATION forming part of Letters Patent No. 470,923, dated March 15, 1892.

Application filed August 19, 1887. Serial No. 247,356. (No model.)

*To all whom it may concern:*

Be it known that I, THOMAS A. EDISON, of Llewellyn Park, in the county of Essex and State of New Jersey, have invented a certain new and useful Improvement in Railway-Signaling, (Case No. 727,) of which the following is a specification.

My invention relates mainly to the operation of electrically controlled or operated signals upon railway-lines such as have heretofore been operated by the closing or opening of circuits by contacts made or broken by the train in its progress; and my object is to do away with the making and breaking of contacts for this purpose.

While my invention was particularly designed with reference to the operation of signals, it is also adapted for use with other electrical apparatus upon railways. I accomplish this by inducing, by the motion of the train and by means of a magnet carried by the train, currents in a stationary circuit, by which induced current the signals are controlled or operated. I prefer to place a large permanent magnet, suitably supported, underneath the tender or other part of the train, with its poles extending down between the rails near the ground. At suitable points along the line between the rails I place underground electro-magnets, each preferably inclosed moisture-tight in an iron box filled with insulating compound. The poles of the magnet extend outside of the box above the surface of the ground, so as to be within a short distance from the poles of the magnet on the train when the latter passes over it. The coils of the magnet are in a closed circuit, preferably a circuit extending from the box and along the line to the signaling-point, where it is connected with the coils of the operating or controlling magnet. It will be seen that when the moving magnet on the train passes rapidly over the stationary magnet beneath it a current will be momentarily induced in the coils of the latter to affect the apparatus designed to be operated or controlled thereby.

My invention is illustrated in the accompanying drawings, in which Figure 1 is a representation of a railway-line provided with my invention, partly in elevation and partly in section; and Fig. 2 illustrates a signal mechanism which may be used.

A represents the tender of a railway-train, running on a track B. Supported beneath the tender is a powerful permanent magnet C, whose poles $a$ extend down at the middle of the track near the ties.

D and D' are suitable iron boxes with removable covers, which are placed underground between the ties at suitable points along the line. Within each box is an electro-magnet E, whose poles $b$ extend up through the cover of the box between the rails at the middle of the track. The coils of these magnets are included in a grounded circuit F F, the wires of which pass through moisture-tight openings in the sides of the box. The box is preferably filled with moisture-proof insulating compound $c$.

G G represent poles, which carry electrically operated or controlled semaphore or other signals. These signaling devices may be of any desired character or placed in any suitable situations. These signals are operated by current induced in the coils of the stationary magnets by the moving magnet on the train.

In Fig. 2, H is a box or case, mounted on the pole or support G and having a front plate provided with an opening or window I. J is the magnet in circuit F. The armature K of the magnet is connected to and operates a propelling-pawl L, which engages with a ratchet-wheel M. N, N', &c., are plates, which may be of red glass, or of other color or material. One movement of the ratchet-wheel brings N before the window, a second movement carries N by the window and leaves N' in the position in which N is shown in the drawings, so that the next impulse will move it before the window. The first movement is caused by a train passing over magnet D, and the second movement by the train passing over magnet D'. For instance, with an arrangement as shown, the train, passing over the magnet E in the box D, generates a current, which sets the signals at both points G G, which may be at opposite ends of a block or section, so as to indicate that a train is on the section, and when the train reaches the box D' a current is generated in the same circuit which removes the danger-signal or sets the signal otherwise. This arrangement of two stationary magnets in the same circuit, one of which sets the signal, while the other removes it, is an important feature of my invention. The particular arrangement, situation, and construction of the signaling devices are immaterial, so long as they are such as can be operated substantially in the manner above set forth. The current may be used to operate electrically-operated bells or other audible signals.

Each block or section of the line may be provided with a stationary magnet or magnets, and with one or more signals controlled thereby.

It is evident that the use of the current induced in the manner described may be used for other or additional purposes than that set forth; that instead of permanent magnets on the train any magnet may be employed.

What I claim is—

1. In a system of electrical signaling, the combination of one or more signals, each having a magnet and means controlled thereby for operating the signal by a first energization of the magnet and for changing the signal by a following energization, said magnet or magnets being included in an electric circuit, and a magnet on a moving train for inducing a current in the coils of stationary electro-magnets, the coils of said stationary magnets being in said electric circuit, whereby the signal is set and then changed by the successive currents induced in the circuit, substantially as set forth.

2. The combination, with a signal arranged at an end of a block of a roadway, which signal has an operating-magnet, and a signal device set by one energization of its operating-magnet and changed by a following energization, of two magnets in the road-bed, one adjacent to each end of the block, a circuit including both the coils of the operating-magnet and the magnets in the road-bed, and an inducing-body on a moving train in position to operate on the magnets in the road-bed, substantially as described.

This specification signed and witnessed this 9th day of August, 1887.

THOMAS A. EDISON.

Witnesses:
A. O. TATE,
WILLIAM PELZER.